April 29, 1969 M. COHN 3,441,859
GENERAL PURPOSE BOOLEAN FUNCTION GENERATOR UTILIZING DUAL-THRESHOLD LOGIC ELEMENTS
Filed Dec. 28, 1965
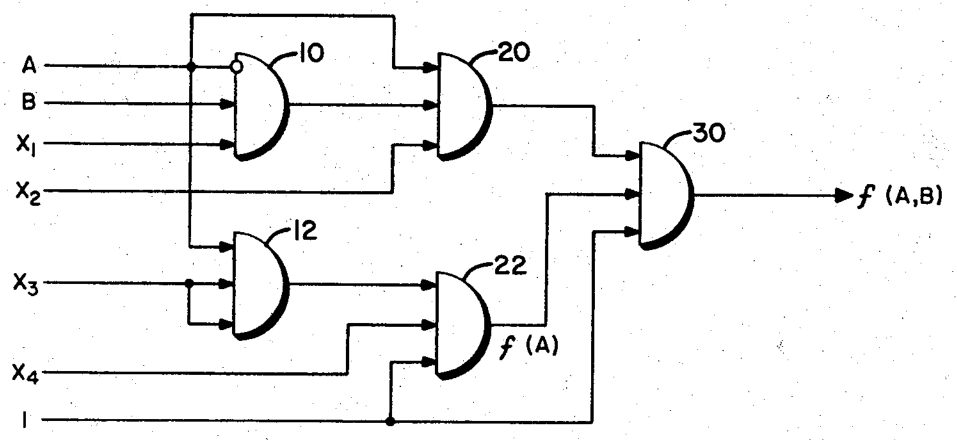
INVENTOR
MARIUS COHN
BY Thomas J. Nikolai
ATTORNEY

United States Patent Office 3,441,859
Patented Apr. 29, 1969

3,441,859

GENERAL PURPOSE BOOLEAN FUNCTION GENERATOR UTILIZING DUAL-THRESHOLD LOGIC ELEMENTS

Marius Cohn, Minneapolis, Minn., assignor to Sperry Rand Corporation, New York, N.Y., a corporation of Delaware Filed Dec. 28, 1965, Ser. No. 516,892
Int. Cl. H03k *19/12*
U.S. Cl. 328—92 3 Claims

ABSTRACT OF THE DISCLOSURE

A network of five dual-threshold logic elements interconnected to provide a device which receives two input variables A and B and provides any one of the sixteen possible Boolean functions of two variables.

This invention relates to function generators and, more particularly, provides improved means for generating any one of the sixteen possible Boolean functions of two independent variables.

Conventional prior art function generators utilize a general purpose Boolean function implemented with traditional Boolean elements, such as disclosed by Szekely in U.S. Patent No. 3,201,574, Aug. 17, 1965. Function generators of this type require a relatively large number of elements to effect and a relatively large number of logic levels to generate a signal representation of a particular function. Recent developments have led to a general purpose majority logic function implemented with majority logic elements, such as disclosed in U.S. Patent 3,296,424 issued to Dr. Marius Cohn, the inventor of the present invention.

It has been determined that the logical function;

$$f(A, B)=((AX_2(\bar{A}BX_1))1X_4(AX_3X_3)))$$

defines a general purpose dual-threshold logic function. It is proposed by this invention to reduce the number of elements and logic levels necessary to generate a signal representative of a particular Boolean function of two independent variables by generating signals in accordance with this general purpose dual-threshold logic function.

The invention is effected by employing three-input dual-threshold logic elements. There are a variety of circuits available, capable of performing the dual-threshold logic function, which are well known in the art (such as set forth by K. Menger in "A Modulo Two Adder for Three Inputs Using a Single Tunnel Diode," IRE Trans. EC–10, pp. 530–531; September 1961) and these circuits of themselves, do not constitute a part of this invention.

The output of a three-input dual-threshold logic element having inputs X, Y, and Z can be represented as (XYZ). The value of the output is "one" if and only if, $X+Y+Z\equiv 2$; otherwise the output is "zero."

Any one of the sixteen possible Boolean functions of two independent variables can be realized by generating a signal in accordance with the general purpose dual-threshold logic function;

$$f(A, B)=((AX_2(\bar{A}BX_1))1(1X_4(AX_3X_3)))$$

where A and B are the two independent variables and $X_1$, $X_2$, $X_3$, and $X_4$ are function selection signals which determine the particular function to be generated. This signal is generated utilizing dual-threshold logic elements. Inspection of the drawing indicates that a signal representative of any one of the sixteen possible Boolean functions of two independent variables may be realized in three logic levels utilizing five dual-threshold logic elements.

Thus it is seen that by implementing the logical function set forth above with dual-threshold logic elements a signal representative of any one of the sixteen possible Boolean functions of two independent variables can be generated in a relatively short period of time utilizing a relatively small number of elements. The novel features which are considered characteristic of this invention are set forth with particularity in the appended claims. The invention itself both as to its organization and method of operation, as well as additional advantages thereof, will be best understood from the following description when read in connection with the accompanying drawing.

The drawing is a logical block diagram of a preferred embodiment of a function generator designed in accordance with this invention. In this drawing each of the blocks represent a dual-threshold logic element. Arrowheads indicate direction; each normal arrowhead represents a normal signal; each small circle "arrowhead" represents a negated input signal.

With reference to the drawing, a logical block diagram of a function generator according to the present invention is shown. The function generator comprises five, three-input dual-threshold logic elements, arranged in three levels of logic. The input terminals of dual-threshold element 10 are connected such that the element is capable of receiving three input signals representative of $\bar{A}$, B, and $X_1$. The input terminals of dual-threshold element 12 are coupled such that the element is capable of receiving three input signals representative of A, $X_3$, and $X_3$. Dual-threshold elements 10 and 12 each generate an output signal in the first logic level.

The output terminal of dual-threshold element 10 is connected to an input terminal of dual-threshold element 20. The remaining two input terminals of dual-threshold element 20 are connected such that the element is capable of receiving signal representations of A and $X_2$. The output terminal of dual-threshold element 12 is connected to an input terminal of dual-threshold element 22. The remaining two input terminals of dual-threshold element 22 are connected such that the element is capable of receiving signal representations of $X_4$ and a binary "one." Dual-threshold elements 20 and 22 each generate an output signal in the second logic level.

The output terminals of dual-threshold elements 20 and 22 are each connected to an input terminal of dual-threshold element 30. The remaining input terminal of dual-threshold element 30 is connected such that the element is capable of receiving a signal representation of a binary "one." Dual-threshold element 30 generates an output signal in the third logic level.

In operation, dual-threshold element 10 receives signal representations of $\bar{A}$, B, and $X_1$ and generates an output signal in accordance with the logical function $(ABX_1)$, which is transmitted to dual-threshold element 20. Dual-threshold element 12 receives signal representations of A and $X_3$ and generates an output signal in accordance with the logical function $(AX_3X_3)$, which is transmitted to dual-threshold element 22. Dual-threshold element 20 receives signal representations of A, $X_2$, and $(\bar{A}BX_1)$ and generates an output signal in accordance with the logical function $(AX_2(\bar{A}BX_1))$, which is transmitted to dual-threshold element 30. Dual-threshold element 22 receives signal representations of a binary "one," $X_4$, and $(AX_3X_3)$ and generates an output signal in accordance with the logical function $(1X_4(AX_3X_3))$, which is transmitted to dual-threshold element 30. Dual-threshold element 30 receives signal representations of $(AX_2(\bar{A}BX_1))$, a binary "one," and $(1X_4(AX_3X_3))$ and generates an output signal in accordance with the logical function:

$$f(A, B)=((AX_2(\bar{A}BX_1))1(1X_4(AX_3X_3)))$$

The particular function, $f(A, B)$, which is to be generated is determined in accordance with the following table.

| Function selection signals | | | | |
|---|---|---|---|---|
| $X_1$ | $X_2$ | $X_3$ | $X_4$ | Function, f(A,B) |
| 0 | 0 | 0 | 0 | 0 |
| 1 | 0 | 0 | 0 | $A \cdot B$ |
| 0 | 1 | 0 | 0 | AvB |
| 1 | 1 | 0 | 0 | $\overline{B}$ |
| 0 | 0 | 1 | 0 | $\overline{A}$ |
| 1 | 0 | 1 | 0 | $\overline{A}$vB |
| 0 | 1 | 1 | 0 | Av$\overline{B}$ |
| 1 | 1 | 1 | 0 | $A \cdot \overline{B} \text{v} \overline{A} \cdot B$ |
| 0 | 0 | 0 | 1 | 1 |
| 1 | 0 | 0 | 1 | $\overline{A}$v$\overline{B}$ |
| 0 | 1 | 0 | 1 | $\overline{A} \cdot \overline{B}$ |
| 1 | 1 | 0 | 1 | B |
| 0 | 1 | 1 | 1 | A |
| 1 | 0 | 1 | 1 | $A \cdot \overline{B}$ |
| 0 | 1 | 1 | 1 | $\overline{A} \cdot B$ |
| 1 | 1 | 1 | 1 | $A \cdot B \text{v} \overline{A} \cdot \overline{B}$ |

The output of dual-threshold element 22, $f(A)$, is representative of all four possible Boolean functions of one independent variable, A. The particular function, $f(A)$, which is generated is determined in accordance with the following table.

| Function selection signals | | |
|---|---|---|
| $X_3$ | $X_4$ | Function, f(A) |
| 1 | 1 | A |
| 1 | 0 | $\overline{A}$ |
| 0 | 1 | 1 |
| 0 | 0 | 0 |

It is understood that suitable modifications may be made in the structure as disclosed provided such modifications come within the spirit and scope of the appended claims. Having now, therefore, fully illustrated and described my invention, what I claim to be patentably novel and desire to protect by Letters Patent is:

1. A function generator, for generating a signal representative of $f(A, B)$ where $f$ is any one of the sixteen Boolean functions of two independent variables A and B, comprising:

- input means for receiving signal representations of independent variables A and B and function selection signals $X_1$, $X_2$, $X_3$, and $X_4$, and a network of dual-threshold logic elements coupled to said input means for utilizing said independent variable signal representations and said function selection signals to generate an output signal representative of $f(A, B)$ in accordance with the logical function, $$f(A, B)=((AX_2(\bar{A}BX_1))1(1X_4(AX_3X_3)))$$

2. A function generator as defined in claim 1 in which said network generates an output signal in three logic levels and comprises five dual-threshold logic elements.

3. A function generator as defined in claim 2 in which:

the first of said three logic levels comprises:
- a first dual-threshold logic element coupled to said input means for utilizing signal representations of $\bar{A}$, B, and $X_1$ to generate a first output signal, and
- a second dual-threshold logic element coupled to said input means for utilizing signal representations of A and $X_3$ to generate a second output signal, and the second of said three logic levels comprises:
- a third dual-threshold logic element coupled to said input means and said first element for utilizing the output signal of said first element and signal representations of A and $X_2$ to generate a third output signal, and
- a fourth dual-threshold logic element coupled to said input means and said second element for utilizing the output signal of said second element and signal representations of $X_4$ and a binary "one" to generate a fourth output signal, and the third of said three logic levels comprises:
- a fifth dual-threshold logic element coupled to said input means and said third and fourth elements for utilizing the output signals of said third and fourth elements and a signal representative of a binary "one" to generate an output signal representative of $f(A, B)$.

References Cited

UNITED STATES PATENTS 3,275,813 9/1966 Brastins ---------- 307—216 X

OTHER REFERENCES

Smith et al.: IBM Technical Disclosure Bulletin, vol. 6, No. 4, September 1963 (pp. 67 and 68).

DONALD D. FORRER, *Primary Examiner.*

U.S. Cl. X.R.

307—203

U.S. DEPARTMENT OF COMMERCE

PATENT OFFICE

Washington, D.C. 20231

UNITED STATES PATENT OFFICE

CERTIFICATE OF CORRECTION

Patent No. 3,441,859 April 29, 1969

Marius Cohn

It is certified that error appears in the above identified patent and that said Letters Patent are hereby corrected as shown below:

Column 1, line 39, "$f(A,B)=((AX_2(\bar{A}BX_1))1X_4(AX_3X_3)))$" should read -- $f(A,B)=((AX_2(\bar{A}BX_1))1(1X_4(AX_3X_3)))$ --. Column 2, line 54 "$(ABX_1)$" should read -- $(\bar{A}BX_1)$ --.

Signed and sealed this 23rd day of February 1971.

(SEAL)
Attest:

Edward M. Fletcher, Jr.
Attesting Officer

WILLIAM E. SCHUYLER, JR.
Commissioner of Patents